United States Patent
Proebstle et al.

(10) Patent No.: US 10,256,649 B2
(45) Date of Patent: Apr. 9, 2019

(54) JUMP-STARTING ARRANGEMENT FOR A MOTOR VEHICLE

(71) Applicant: Bayerische Motoren Werke Aktiengesellschaft, Munich (DE)

(72) Inventors: Hartmut Proebstle, Wuerzburg (DE); Holger Witt, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 857 days.

(21) Appl. No.: 13/957,825

(22) Filed: Aug. 2, 2013

(65) Prior Publication Data

US 2013/0314024 A1    Nov. 28, 2013

Related U.S. Application Data

(63) Continuation of application No. PCT/EP2012/051612, filed on Feb. 1, 2012.

(30) Foreign Application Priority Data

Feb. 3, 2011 (DE) .................. 10 2011 003 565

(51) Int. Cl.
*F02N 11/08* (2006.01)
*F02N 11/14* (2006.01)
(Continued)

(52) U.S. Cl.
CPC .............. *H02J 7/0054* (2013.01); *B60L 1/00* (2013.01); *B60L 3/0046* (2013.01); *B60L 11/12* (2013.01);
(Continued)

(58) Field of Classification Search
CPC ...... F02N 11/0866; F02N 11/14; H02J 7/0054
(Continued)

(56) References Cited

U.S. PATENT DOCUMENTS 3,582,669 A * 6/1971 Dempsey ............. H02H 11/002
307/127
3,949,289 A * 4/1976 Day .................... F02N 11/0866
307/10.7
(Continued)

FOREIGN PATENT DOCUMENTS

DE     100 59 038 A1    5/2002
DE     101 19 985 A1    10/2002
(Continued)

OTHER PUBLICATIONS

International Preliminary Report on Patentability (PCT/IB/373) including Written Opinion (PCT/ISA/237) with English translation thereof dated Aug. 6, 2013 {Ten (10) pages}.

(Continued)

*Primary Examiner* — Richard Isla
*Assistant Examiner* — Manuel Hernandez
(74) *Attorney, Agent, or Firm* — Crowell & Moring LLP

(57) ABSTRACT

A jump-starting arrangement is provided for a motor vehicle, wherein the motor vehicle has an engine control unit and a starter for an internal-combustion engine. The motor vehicle is equipped with at least two partial onboard power systems, which are mutually coupled by way of at least one electric separator element. Each partial onboard power system, respectively, is equipped with at least one rechargeable electric energy accumulator. The two partial onboard power systems each have a jump-starting base, and the respective jump-starting bases are galvanically separated from one another.

6 Claims, 2 Drawing Sheets

(51) Int. Cl.
  *H02J 7/00*       (2006.01)
  *B60L 1/00*       (2006.01)
  *B60L 3/00*       (2019.01)
  *B60L 11/12*      (2006.01)
  *B60L 11/18*      (2006.01)
  *B60L 15/20*      (2006.01)

(52) U.S. Cl.
  CPC ....... *B60L 11/1861* (2013.01); *B60L 15/2072* (2013.01); *F02N 11/0866* (2013.01); *F02N 11/14* (2013.01); *B60L 2260/22* (2013.01); *B60L 2260/26* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7275* (2013.01)

(58) Field of Classification Search
  USPC ....................................................... 320/105
  See application file for complete search history.

(56) References Cited

U.S. PATENT DOCUMENTS

| | | | |
|---|---|---|---|
| 4,082,992 A * | 4/1978 | Day | B60R 16/0235 307/10.7 |
| 4,999,562 A * | 3/1991 | Hill | H02J 7/1423 307/71 |
| 6,211,577 B1 | 4/2001 | Alksnat et al. | |
| 6,320,358 B2 * | 11/2001 | Miller | H02J 7/1423 307/10.1 |
| 6,396,240 B1 | 5/2002 | Kahlon et al. | |
| 2003/0155814 A1 | 8/2003 | Gronbach | |
| 2005/0067898 A1 | 3/2005 | Gronbach | |

FOREIGN PATENT DOCUMENTS

| | | |
|---|---|---|
| DE | 203 09 871 U1 | 9/2003 |
| DE | 103 13 752 A1 | 10/2004 |
| DE | 103 44 563 A1 | 4/2005 |

OTHER PUBLICATIONS

Corresponding International Search Report with English Translation dated Apr. 24, 2012 (four (4) pages).

German Search Report with English Translation dated Sep. 23, 2011 (ten (10) pages).

\* cited by examiner

JUMP-STARTING ARRANGEMENT FOR A MOTOR VEHICLE

CROSS REFERENCE TO RELATED APPLICATIONS

This application is a continuation of PCT International Application No. PCT/EP2012/051612, filed Feb. 1, 2012, which claims priority under 35 U.S.C. § 119 from German Patent Application No. DE 10 2011 003 565.6, filed Feb. 3, 2011, the entire disclosures of which are expressly incorporated by reference herein.

BACKGROUND AND SUMMARY OF THE INVENTION

The invention relates to a jump-starting arrangement for a motor vehicle, wherein the motor vehicle has an engine control unit and a starter for an internal-combustion engine. The motor vehicle is equipped with at least two partial onboard power systems, which are mutually coupled by way of at least one electric separator element. Each partial onboard power system is equipped with at least one rechargeable electric energy accumulator.

The onboard power system of motor vehicles is normally equipped with a starter battery in order to start the engine by means of a starter and to supply consuming devices with electric power in the event of a lack of coverage with electric power by the generator of the vehicle. The tasks of the starter battery therefore exceed the mere starting of the engine, so that, in the vehicle development, the starter battery is called an onboard power system battery or SLI battery, which stands for starting, lighting and ignition.

In the event of a battery failure or battery defect, the vehicle can be jump-started and/or the battery can be recharged. For the jump start as well as for the recharging, an external current and voltage source, such as a charging device or the onboard power battery of another vehicle (donor vehicle), is galvanically connected with that of the battery of the receiver vehicle. The electric connection is established by means of transfer cables. A transfer cable set consists of two insulated lines which are terminated by terminals or clips, which are designed for the size of the standard battery terminals (see, for example, Standard EN 50342-2 "Lead-Acid Starter Batteries. Dimensions of Batteries and Marking of Terminals" and Standard DIN 72553 "Jumper Cables for Road Vehicles with an Internal-Combustion Engine; Measurements, Requirements, Testing"). The positive line of the cable set connects the positive potentials, which means, for example, the two positive poles of the receiver and donor battery or the positive pole of the receiver battery with the positive output of a charging device. The negative line establishes a common ground. High currents flow in the case of a jump start (close to the kilo ampere range), so that the lines of the cable set have to have a correspondingly large line cross-section.

In many vehicle models, the battery terminals are not freely accessible, as, for example, when installed in the trunk. In this case, it is not the positive pole of the battery that is contacted but a terminal electrically connected with the positive line of the battery, thus, the line leading directly to the positive pole of the battery. This terminal is called a jump-starting base and is a connection identified in the vehicle and/or in the vehicle manual for the purpose of recharging and jump starting, and is easily accessible from the outside. It is usually situated in the area of the engine compartment and, after the opening of the hood, is easily accessible for connecting a charging clip. A jump-starting circuit, which is protected against a polarity reversal, for a vehicle having a starter battery is described in the state of the art, for example, in U.S. Pat. No. 6,211,577B1.

Modern motor vehicles with a voltage level of the onboard power system of 12V have an engine start-stop function, i.e. in suitable driving situations, the engine is switched off during the driving operation and is newly started after a brief time period. Examples where this occurs are waiting at a traffic light or at a railroad crossing. Preventing the engine from running saves fuel. Because the engine starts take place more frequently compared to vehicles without a start-stop function and because the electric consuming devices have to be supplied by way of the battery during the driving operation while the engine is switched off, the battery of the vehicle is in high demand. Vehicles with a start-stop function or vehicles with a high basic-current load, such as municipal or enforcement vehicles, are frequently equipped with a second onboard power system which has its own battery often called an additional-start battery. The partial onboard power system with the additional-start battery is separated from the partial onboard power system with the main battery, also called basic battery, by a battery separating relay and/or a DC converter. A function—and cost-optimized variant is the use of a unidirectional DC converter without a battery separating relay. The DC converter is electrically supplied by the partial onboard power system with the main battery and transmits electric power from the input-side basic onboard power system to the output-side additional-start onboard power system. Usually, the engine control unit is situated in the input-side onboard power system with the main battery, and the starter is situated in the output-side onboard power system with the additional-start battery. For a vehicle with two onboard power system batteries coupled by way of a DC converter, U.S. Pat. No. 6,396,240 B1 describes a jump-starting arrangement having a third battery.

It is an object of the invention to provide an improved jump-starting arrangement for a vehicle having at least two partial onboard power systems.

This and other objects are achieved by a jump-starting arrangement for a motor vehicle, wherein the motor vehicle has an engine control unit and a starter for an internal-combustion engine. The motor vehicle is equipped with at least two partial onboard power systems, which are mutually coupled by way of at least one electric separator element, and each partial onboard power system, respectively, is equipped with at least one rechargeable electric energy accumulator. At least two of the partial onboard power systems have a jump-starting base, and the jump-starting bases are galvanically separated from one another According to the invention, at least two of the partial onboard power systems have a jump-starting base. The jump-starting bases are galvanically separated from one another.

It is an advantage of the invention that the energy accumulators in the respective onboard power systems are electrically accessible from the outside independently of one another. In each case, the external current and voltage supply of all energy accumulators takes place directly, i.e. no electric power drops out at the electric separating element.

According to an embodiment of the invention, the electric separating element is constructed as a DC converter and/or as a relay or as a switch. The generality will not be restricted if a DC converter is considered in the present specification.

According to an embodiment of the invention, the jump-starting bases can be contacted via an external current source by way of a cabled connection in order to charge the rechargeable electric energy accumulator.

This embodiment has the advantage that all energy accumulators can be charged rapidly, for example, in the case of a total discharge after being parked for a long time. The limitation of the electric power taken in by an electric energy accumulator takes place as a result of the recharging capacity of the energy accumulator or of the current-carrying capacity of the external current source at a defined charging voltage. The DC converter does not have a limiting effect.

The charge cable preferably has at least two parallel junctions in order to charge at least two of the energy accumulators with the same electric potential.

This embodiment has the special advantage that at least two energy accumulators can be charged by way of an external voltage source.

According to a further embodiment of the present invention, at least two of the partial onboard power systems are electrically connected by way of the jump-starting bases with an external current source in order to implement a jump start of the internal-combustion engine.

By way of this embodiment, the jump-starting capacity of the motor vehicle by use of an external voltage source is ensured, particularly in the event that all energy accumulators have been totally discharged, the engine control unit is electrically supplied in the partial onboard power system on the input side oriented toward the DC converter, and the starter of the vehicle is supplied in a second partial onboard power system oriented on the output side toward the DC converter.

The invention is based on the following considerations. Motor vehicles require an electric access to the starting and charging by way of an external voltage source or an external battery in emergency cases and when used at the dealer or factory within the scope of a jump-starting concept. Future hybrid and plug-in hybrid vehicles, and vehicles with an engine start-stop functionality, have several batteries with a voltage level of 12V. The basic onboard power system and the starter are supplied by separate batteries in separate onboard power systems. These onboard power systems are galvanically separated; the electric coupling usually takes place by way of a unidirectional DC converter, and in rarer cases, by way of a bidirectional DC converter. If necessary, the linking to the high-voltage onboard power system takes place by way of a further direct DC converter. In the case of a jump start, an electric access from the outside is to be provided such that a failure of the basic battery as well as of the starter battery is eliminated.

Currently, vehicles have a single jump-starting base. The external feeding of electric power into several onboard power systems with a voltage level of 12V, for example, the basic onboard power system and the additional-start onboard power system, can only be achieved insufficiently by means of the concept of a central jump-starting base.

A suitable measure is the introduction of a second jump-starting base; i.e. each battery in each partial onboard power system has a jump-starting base. In the case of, for example, two partial onboard power systems, the supplying of the partial onboard power systems can take place from the outside by use of a voltage source or external battery with a Y-shaped starter cable. The Y-shaping is exhibited by the fact that the positive line of the jump start cable, coming from the external source or battery, has a junction into an electric connection for each of the jump-starting bases. During a jump start, both power systems of the vehicle to be supplied can simultaneously be supplied by way of a single positive jump-starting line, i.e. by way of a single external voltage source or external battery.

In the case of grounded partial onboard power systems, the connection of the ground points of the partial onboard power systems is not necessary and can take place by way of a conventional jump-starting ground cable with a branch to a central vehicle ground point.

In the case of partial onboard power systems separated from the ground, a jump-starting ground cable in a Y-shape is used analogous to the positive jump-starting line. This measure has several advantages. The jump-starting capacity of vehicles with separated starting onboard power systems is ensured. The energy supply of all partial onboard power systems is ensured during the installation in the production factory, when used at the dealer, for example, in the event of a repair, or during a recharging by the ultimate customer. This makes a considerable contribution to avoiding breakdowns and warranty costs.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
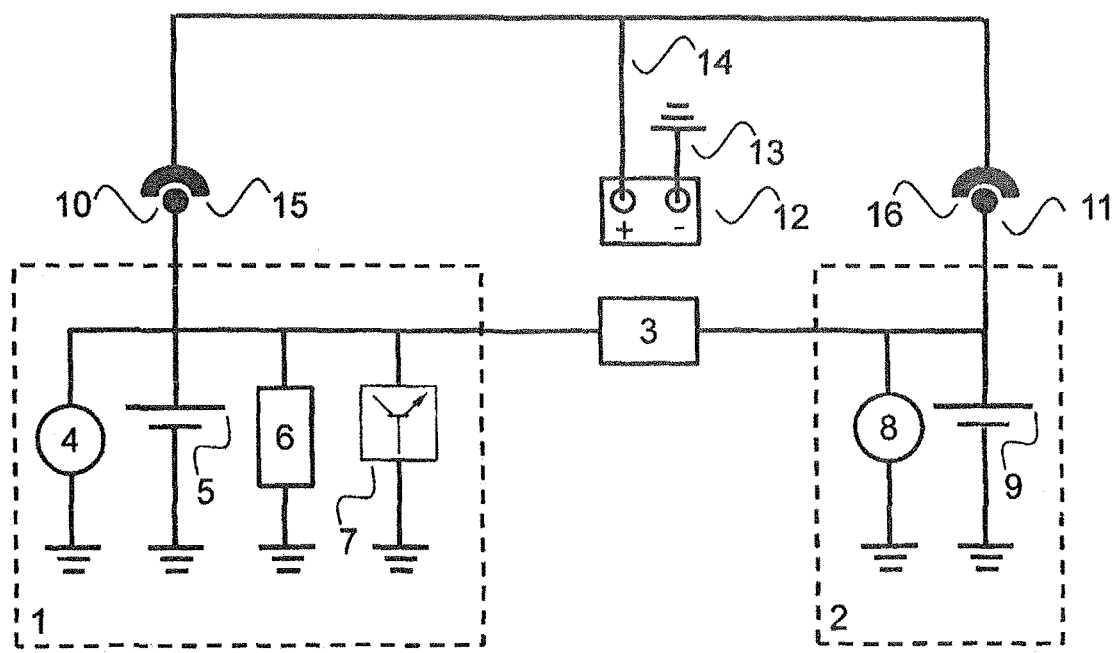
FIG. 1 is a schematic view of a jump-starting arrangement for a motor vehicle having two partial onboard power systems.

FIG. 1 is a schematic diagram of the topology of an onboard power system of a motor vehicle, having a first partial onboard power system—here the basic onboard power system 1—having a voltage level of 14V. The basic onboard power system has a generator 4 driven by an internal-combustion engine, which generator 4 supplies electric consuming devices 6 and particularly control devices, such as the engine control unit 7, with electric power and charges a first electric energy accumulator 5 in the driving operation. The first electric energy accumulator 5 is called an onboard power system battery. The motor vehicle has a second partial onboard power system—here the additional-start onboard power system 2—having a second electric energy accumulator 9, which is called an additional-start battery. The additional-start battery 9 supplies the starter 8 of the vehicle with electric power in order to start the internal-combustion engine. The additional-start battery 9 is charged by the basic onboard power system 1. For this purpose, a unidirectional DC converter 3 in the power class of approximately 150 W is used, which is supplied by the basic onboard power system 1. As a result, at a charging voltage of approximately 14V, the additional-start battery 9 is charged with approximately 10 ampere. The onboard power network and the additional-start battery 9 may be implemented using lead-acid technology.

Figure 2:
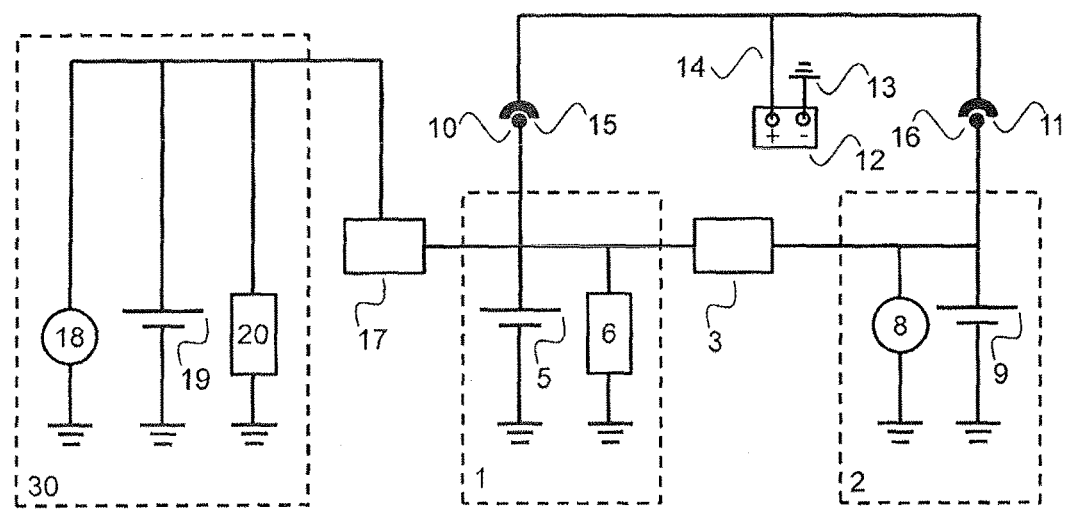
FIG. 2 is a schematic view of a jump-starting arrangement for a motor vehicle having three partial onboard power systems.

FIG. 2 illustrates the 14V onboard power system of a motor vehicle according to FIG. 1 with an additional third partial onboard power system 30. The same reference numbers apply as in FIG. 1. The third onboard power system 30 is a high-voltage onboard power system of the motor vehicle, such as a hybrid or plug-in vehicle. The high-voltage onboard power system has a high-voltage accumulator 19, for example, in the lithium-ion technology, an electric driving machine 18 and a high-voltage consuming device 20. The high-voltage onboard power system is electrically coupled by way of a high-voltage direct DC converter 17 with the basic onboard power system.

In FIG. 1 and FIG. 2, the onboard power system battery 5 has a first jump-starting base 10 at its positive polarity, and the additional-start battery 9 has a second jump-starting base 11 at its positive polarity, which jump-starting bases 10,11 are galvanically separated from one another. When one of the two, or both, batteries 5,9 have to be recharged, for example, during the production of the vehicle, during a stay in the shop or after a vehicle was parked for a long time, an external current source 12 will act as the supplier of electric power. The external current source 12 may, for example, be a charging device or a third battery. By use of a charging cable 14, which is called a positive line, a jump-starting base 10,11 is electrically contacted with the output of the charging device with the positive potential or with the positive pole of the third battery. The charging cable 14 has a parallel junction, so that the first jump-starting base 10 can be contacted by way of a first terminal 15 or a first clip, and the second jump-starting base 11 can be contacted by way of a second terminal 16 or a second clip. A ground line 13 connects the output of the charging device with the negative potential or the negative pole of the third battery with the ground of the vehicle to which the onboard power system battery and the additional-start battery are also connected.

By way of this jump-starting arrangement, the onboard power system battery 5 and the additional-start battery 9 can simultaneously be charged via a charging device. Optionally, only the first terminal or only the second terminal can be connected. If only the first terminal 15 is connected with the first jump-starting base 10, the onboard power system battery 5 is charged and the engine control unit 7 and the unidirectional DC converter 3 are supplied with operating voltage. Therefore, the additional-start battery 9 is also charged by way of the DC converter 3, in which case the DC converter limits the flow of electric power. It should be appreciated that the DC converter 3 can be implemented as a relay or a switch, as noted above. A vehicle start can take place under the condition that the additional-start battery 9 has the charge level necessary for the engine start in order to supply the high starting current of up to 1 kilo ampere for an engine start. When the additional-start battery 9 has been totally discharged, the engine start can take place only after a longer charging time of the additional-start battery by way of the DC converter.

The additional-start battery 9 is charged if only the second terminal 16 is connected with the second jump-starting base 11. An engine start of the vehicle can take place under the condition that the onboard power system battery 5 has a sufficient charging level for supplying the engine control unit 7 with its operating voltage, and that either the additional-start battery 9 to be charged or the external current source 12 supply the starting current required for the engine start. If the onboard power system battery 5 is in a totally discharged state, the vehicle cannot be started with only the second terminal being connected to the external source even after an extended charging time. When the first and the second terminal are connected to the respective jump-starting bases, an immediate engine started can be implemented as a jump start under the condition that the external current source can supply the starting current required for an engine start. As an alternative, the first and the second terminal are in each case mounted on two separate positive lines, so that two external current sources can be used for a jump start. Each of the two current sources will then have a ground line to the vehicle.

LIST OF REFERENCE NUMBERS

1. Basic onboard power system
2. Additional-start onboard power system
3. DC converter
4. Generator
5. Onboard power system battery
6. Consuming device
7. Engine control unit
8. Starter
9. Additional-start battery
10. First jump-starting base
11. Second jump-starting base
12. External current source
13. Ground line
14. Positive line
15. First terminal
16. Second terminal
17. High-voltage direct DC converter
18. Electric machine
19. High-voltage accumulator
20. High-voltage consuming device
30. High-voltage onboard power system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A jump-starting arrangement for a motor vehicle equipped with an engine control unit and a starter for an internal-combustion engine, the jump-starting arrangement comprising:
   first and second partial onboard power systems, each of the first and second partial onboard power systems being equipped with at least one rechargeable electric energy accumulator;
   an electric separator element by way of which the first and second partial onboard power systems are mutually coupled; and
   an external current source,
   wherein the first partial onboard power system has a first jump-starting base and the second partial onboard power system has a second jump-starting base, the first and second jump-starting bases being galvanically separated from one another,
   wherein the first jump-starting base is physically accessible externally from the motor vehicle so as to be coupleable directly to a terminal of a first jump-starting cable during a jump start of the internal-combustion engine of the motor vehicle,
   wherein the second jump-starting base is physically accessible externally from the motor vehicle so as to be coupleable directly to a terminal of a second jump-starting cable during the jump start of the internal-combustion engine of the motor vehicle,
   wherein the first partial onboard power system and second partial onboard power system are configured to couple in parallel with the external current source by virtue of a parallel junction of the first jump-starting cable and the second jump-starting cable such that the external current source charges each of the respective accumulators, wherein each of the first and second jump-starting bases are distinct from respective terminals of each of the at least one rechargeable electric energy accumulators.

2. The jump-starting arrangement according to claim 1, wherein the electric separating element is a DC converter.

3. The jump-starting arrangement according to claim 1, wherein the electric separating element is a relay.

4. The jump-starting arrangement according to claim 1, wherein the electric separating element is a switch.

5. The jump-starting arrangement according to claim 1, further comprising:
  a first cable connection formed by the first jump-starting cable between the first jump-starting base and the external current source; and
  a second cable connection formed by the second jump-starting cable between the second jump-starting base and the external current source,
  wherein the first and second jump-starting bases are configured to simultaneously couple with the external current source via the respective first and second cable connections between each base and the external current source.

6. The jump-starting arrangement according to claim 1, wherein the first and second partial onboard power systems are electrically connected via the first and second jump-starting bases with the external current source, whereby the jump-start of the internal-combustion engine of the motor vehicle is carried out.

\* \* \* \* \*